United States Patent
Kacewicz et al.

(10) Patent No.: US 12,074,907 B2
(45) Date of Patent: *Aug. 27, 2024

(54) SYSTEMS AND METHODS OF DETECTING ANOMALOUS WEBSITES

(71) Applicant: IronNet Cybersecurity, Inc., McLean, VA (US)

(72) Inventors: Ania Kacewicz, Baltimore, MD (US); Christopher S. Stinson, Odenton, MD (US)

(73) Assignee: IronNet Cybersecurity, Inc., McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/209,645

(22) Filed: Jun. 14, 2023

(65) Prior Publication Data

US 2023/0328101 A1  Oct. 12, 2023

Related U.S. Application Data

(63) Continuation of application No. 16/909,435, filed on Jun. 23, 2020, now Pat. No. 11,716,350.

(51) Int. Cl.
*H04L 9/40* (2022.01)
*G06F 16/951* (2019.01)
(Continued)

(52) U.S. Cl.
CPC ........ *H04L 63/1483* (2013.01); *G06F 16/951* (2019.01); *G06F 40/143* (2020.01);
(Continued)

(58) Field of Classification Search
CPC . H04L 63/1483; H04L 63/14; H04L 63/1425; G06F 16/951; G06F 40/143; G06F 40/221
See application file for complete search history.

(56) References Cited

U.S. PATENT DOCUMENTS 7,201,323 B2  4/2007  Kotovich
9,183,672 B1  11/2015  Hickman
(Continued)

OTHER PUBLICATIONS

Kacewicz et al; U.S. Appl. No. 16/909,435, filed Jun. 23, 2020.
(Continued)

*Primary Examiner* — Catherine Thiaw
(74) *Attorney, Agent, or Firm* — Fitch, Even, Tabin & Flannery LLP

(57) ABSTRACT

Systems and methods for detecting anomalous and malicious URL's by analyzing markup language structure, such as HTML, are provided. The systems and methods include the querying of a URL to obtain the markup language data. The markup language data their corresponding elements and their locations rows/depths are parsed into coordinates within a 2-dimensional grid and then processed into features. A color is assigned to each feature as a function of the type of feature. The three dimensions (x, y coordinates and color coordinate) of the features are used to generate an image. The generated images are then compressed to facilitate processing. The compressed images of common websites are analyzed using deep machine learning algorithms to generate a model that represents their structure. These generated models are then used to detect suspicious and/or anomalous websites.

19 Claims, 6 Drawing Sheets
(3 of 6 Drawing Sheet(s) Filed in Color)

(51) Int. Cl.

| | | |
|---|---|---|
| *G06F 40/143* | (2020.01) | |
| *G06F 40/221* | (2020.01) | |
| *G06N 3/088* | (2023.01) | |
| *G06T 9/00* | (2006.01) | |
| *G06T 15/00* | (2011.01) | |
| *G06V 10/56* | (2022.01) | |

(52) U.S. Cl.
CPC ........... *G06F 40/221* (2020.01); *G06N 3/088* (2013.01); *G06T 9/00* (2013.01); *G06T 15/00* (2013.01); *G06V 10/56* (2022.01); *H04L 63/14* (2013.01); *H04L 63/1425* (2013.01); *G06T 2207/20081* (2013.01)

(56) References Cited

U.S. PATENT DOCUMENTS

| | | | |
|---|---|---|---|
| 9,887,992 | B1 | 2/2018 | Venkat |
| 11,716,350 | B2 | 8/2023 | Kacewicz |
| 2012/0198528 | A1 | 8/2012 | Baumhof |
| 2016/0055132 | A1* | 2/2016 | Garrison ............... G06F 16/958 706/12 |
| 2018/0103043 | A1 | 4/2018 | Kupreev |
| 2018/0115584 | A1 | 4/2018 | Alhumaisan |
| 2019/0028473 | A1 | 1/2019 | Hunt |
| 2019/0108204 | A1 | 4/2019 | Ghosh |
| 2019/0287307 | A1 | 9/2019 | Rogers |
| 2019/0294149 | A1 | 9/2019 | Kolouri |
| 2019/0334947 | A1* | 10/2019 | Govardhan ........... G06F 16/951 |
| 2019/0394148 | A1 | 12/2019 | Duan |
| 2020/0204574 | A1 | 6/2020 | Christian |
| 2020/0210511 | A1 | 7/2020 | Korobov |
| 2020/0401431 | A1* | 12/2020 | Rashid ................ G06F 9/45512 |
| 2021/0075826 | A1* | 3/2021 | Johnson .................. H04L 67/02 |
| 2021/0397877 | A1 | 12/2021 | Kacewicz |
| 2021/0398348 | A1 | 12/2021 | Cotteleer |

OTHER PUBLICATIONS

Makhzani et al; "Adversarial Autoencoders"; arXiv:1511.05644v2 [cs.LG], May 25, 2016, pp. 1-16.

Medvet et al; "Visual-Similarity-Based Phishing Detection"; ACM, 2008, 6 pages (Year:2008).

PCT; International Search Report and Written Opinion issued in PCT/US21/38195 mailed from the International Searching Authority on Sep. 30, 2021.

USPTO; Non-Final Office Action issued in U.S. Appl. No. 16/909,435 mailed Aug. 12, 2022.

USPTO; Notice of Allowance issued in U.S. Appl. No. 16/909,435 mailed Mar. 13, 2023.

Zhou et al; "A Survey of Colormaps in Visualization"; IEEE Trans Vis Comput Graph, Oct. 26, 2015; Retrieved from the internet Aug. 22, 2021: https://www.ncbi.nlm.nih.gov/pmc/articles/PMC4959790/.

* cited by examiner

SYSTEMS AND METHODS OF DETECTING ANOMALOUS WEBSITES

SYSTEMS AND METHODS OF DETECTING ANOMALOUS WEBSITES

This application is a continuation of U.S. application Ser. No. 16/909,435, filed Jun. 23, 2020, for SYSTEMS AND METHODS OF DETECTING ANOMALOUS WEBSITES, which is incorporated in its entirety herein by reference.

FIELD OF THE DISCLOSURE

The present disclosure relates to systems, devices, methods for detecting malicious websites on a network. More particularly, the disclosure relates to such detection by analyzing and visualizing markup language data from websites.

BACKGROUND OF THE DISCLOSURE

Cybercriminals use software called "malware" to compromise and damage network entities and to gain access to private assets and data. Malware is often distributed when a user accesses a URL or website, and the malware is embedded in the markup language, e.g., raw HTML data, within the website. Malicious actors can then use the website itself to trick users into providing information or enabling them to gain access to user devices or important data. Detecting such infected websites early helps minimize and curb the spread of the damage inflicted by malicious actors. As noted above, malicious websites and websites that have been compromised by cybercriminals or hackers typically attempt to appear normal and benign in order to prevent them being blacklisted and to encourage users to proceed. The indicators of compromise are generally not visible in the website layout and are typically hidden beneath the surface of what can be seen by a user.

Conventional methods of malware detection include so called "signature-based" detection methods. Signature based detection is a process where one or more unique file and/or data identifiers about a known threat can be used to identify the threat in the future. For example, a unique set of patterns or data may be identified. These patterns include, for example, file hashes or other more complex sets of strings and regular expressions related to a particular file type or network metadata. If a specific file hash, or other pattern associated with a known malicious threat are observed, then the data can be flagged as known malicious activity. However, sophisticated cybercriminals who generate zero-day attacks know how to avoid detection by signatures-based methods. In addition, cybercriminal activities can be embedded in a website, and as such, their malicious activity can occur and continue indefinitely, while hidden in plain sight. As such, the majority of malicious or hacked domains are only discovered after many users have already been compromised.

In addition to the above disadvantages, conventional methods of discovering compromised websites or domains typically utilize manual inspection techniques to determine indicators of compromise. Because of the volume of possible websites, manual detection makes this task difficult and slow, which in turn allows a bad actor to continue to spread the malicious activity impacting more users. Many known methods rely on previously classified malicious websites, either to train a model in a supervised fashion (and as such have clear labels of benign and malicious websites) or alternatively to generate a signature for the malicious site. Disadvantages of these and other signature-based methods are that any change in the malicious site behavior or content will result cause the signature to fail detecting it. As a result, it is very difficult to obtain sufficient malicious samples to train the model without having large amounts of training samples.

BRIEF SUMMARY OF THE DISCLOSURE

The embodiments of the present invention overcome the challenges of known systems and methods. Embodiments of the invention utilize a compression methodology that includes content feature embedding of markup language data or files (e.g., HTML files) of websites. Content features include, for example, tag type, attribute name, and attribute or element values. The markup language files are mapped into a three-dimensional space. In an embodiment, a two-dimensional mapping with three red/green/blue (RGB) channels, effectively constituting an image, is created. The method of embedding is adapted and configured to preserve the two-dimensional characteristics of the locations of the HTML tags and attributes throughout the files and assigns RGB values to specific tags, attributes, features and/or names. The RGB values for each different content feature type (e.g. tag type, attribute name, attribute value, etc.) are chosen within space-separated spheres within an RGB cube. This image embedding is then compressed to standard image modeling sizes to reduce computational and modeling complexity.

In an embodiment, a method for detecting anomalous websites is provided. In an embodiment the method comprising the steps of: parsing the code of a plurality of sample websites into a plurality of characteristics for each of the plurality of sample websites; mapping the plurality of characteristics into a plurality of corresponding 3D color cubes; generating a plurality of images based on the plurality of corresponding 3D color cubes; compressing the plurality of images; generating a normalcy model of the sample websites with the plurality of images that have been compressed using an autoencoder; comparing a compressed image of a new website to the normalcy model; and determining whether the suspected website is anomalous relative to a threshold of normalcy. In an embodiment, the step of parsing the code comprises analyzing 2D representations of the code of the plurality of sample websites. In an embodiment, the plurality of characteristics includes at least one of tags, attributes, and content features. In an embodiment, the step of mapping comprises assigning colors within the plurality of 3D color cubes as a function of a type of the plurality of characteristics. In an embodiment, the corresponding 3D color cubes are RGB color cubes. In an embodiment, the step of generating the plurality of images comprises mapping an x-coordinate, a y-coordinate and a color-coordinate of the 3D color cubes. In an embodiment, the code is a nested markup language. In an embodiment, the code is one of HTML, XHTML, XML, JSON, and LATEX. In an embodiment, the autoencoder is a convolutional adversarial autoencoder.

In an embodiment, a non-transitory computer readable medium storing computer program instructions is provided. The non-transitory computer readable medium storing computer program instructions that, when executed by a processor, cause the processor to perform a method comprising the steps of: parsing the code of a plurality of sample websites into a plurality of characteristics for each of the plurality of sample websites; mapping the plurality of characteristics into a plurality of corresponding 3D color cubes; generating a plurality of images based on the plurality of corresponding 3D color cubes; compressing the plurality of images; generating a normalcy model of the sample websites with the plurality of images that have been compressed using an autoencoder; comparing a compressed image of a new website to the normalcy model; and determining whether the suspected website is suspicious relative to a threshold of normalcy.

In an embodiment, a system for detecting anomalous websites is provided. In an embodiment, the system comprises: a first database for storing and receiving data representing a plurality of websites obtained from a device connected to the internet; a distributed engine for analyzing the data, creating a 3D color mapping of the data, and generating a plurality of images corresponding to the plurality of websites based on the 3D color mapping; and training module (e.g., machine learning training module) for creating a normalcy model based on the plurality of compressed images; wherein an anomalous website is detectable based on a comparison to the normalcy model. In an embodiment, the distributed engine is further adapted and configured to compress the plurality of images. In an embodiment, the device is one of a laptop, a PC, phone, and a tablet. In an embodiment, system further comprises a second database for storing a list of the anomalous websites. In an embodiment, the first data base and the second database are the same. In an embodiment, creating a plurality of images comprises the mapping an x-coordinate, a y-coordinate and a color-coordinate of the 3D color mapping. In an embodiment, the data comprises nested language data of the plurality of websites. In an embodiment, creating the 3D color mapping of the data comprises assigning tags, attributes and content features of the nested language data to an RGB cube. In an embodiment, the nested language is one of HTML, XHTML, XML, JSON, and LATEX. Various aspects of the systems, methods and devices herein may take place in a cloud computing environment.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure is illustrated and described herein with reference to the various drawings, in which like reference numbers are used to denote like system components, as appropriate, and in which.

DETAILED DESCRIPTION OF THE DISCLOSURE

Systems and methods for detecting anomalous and malicious URL's by analyzing markup language structure, such as HTML, are provided. The systems and methods include the querying of a URL to obtain the markup language data. The markup language data elements, which are defined by start tags, their corresponding content and end tags, their locations rows/depths are parsed into coordinates within a 2-dimensional grid and then processed into features. A color is assigned to each feature as a function of the type of feature (e.g. specific tag, attribute, script). The three dimensions (x, y coordinates and color) of the features are used to generate an image. The generated images are then compressed to facilitate processing. The compressed images of common websites are analyzed (e.g., using deep machine learning) to generate a model that represents their structure. These generated a normalcy model, that is then used to detect suspicious websites by comparing a suspected website relative to the model.

Embodiments of the invention provide systems and methods for the detection of malicious, suspicious, compromised, or otherwise atypical (collectively referred to herein as "anomalous") websites. The systems and methods herein aid in the prevention of malware and unknown zero-day website attacks. In an embodiment, the markup language (e.g., HTML, XHTML, XML, JSON, LATEX, or other nested languages.) of known, uncompromised or benign sites are converted to a compressed image format and passed through an adversarial auto-encoder in order to train and generate a model for normal sites. This generated model is then used to assess unknown websites to determine whether a given website is anomalous or malicious.

There are several advantages of the embodiments of the present invention over conventional systems and methods. For example, the embodiments herein are capable of processing multiple websites simultaneously. As such, a large volume can be analyzed at the same time to assess whether a given website appears anomalous in comparison to benign/non-compromised websites. Also, the embodiments of the invention use analysis and processing of website markup language structure, such as HTML structure, to perform the detection as further described below. Thus, signature-based methods are not required for detection according to the embodiments of the systems and methods provided herein. In addition, the embodiments do not require labeled training data or the use of previously determined malicious websites.

Figure 1:
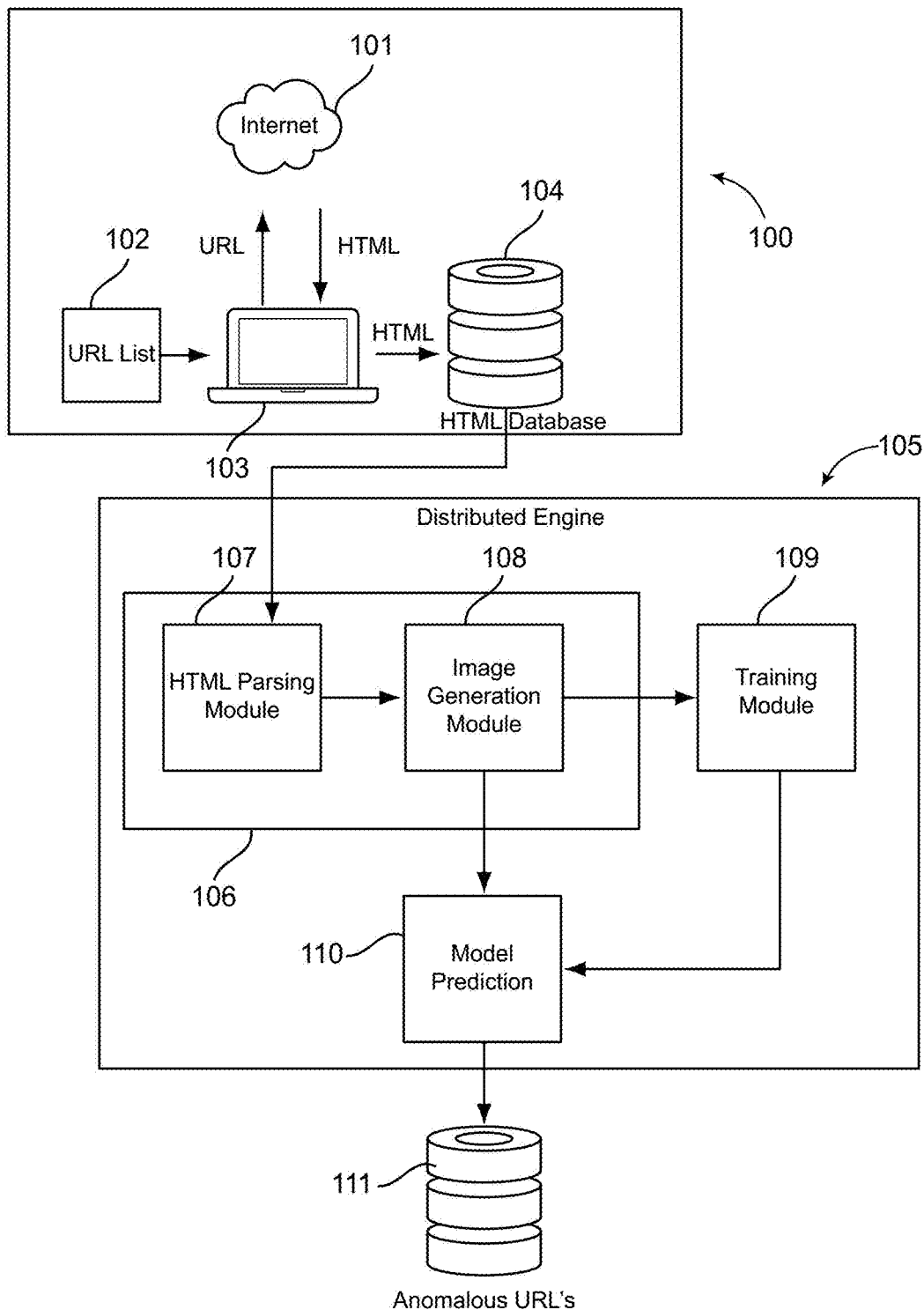
FIG. 1 is a block diagram of an exemplary embodiment of a system of the present invention.

Turning to FIG. 1, a block diagram of an embodiment of a system of the present invention is provided. In this embodiment, HTML code of a website is used as the markup language. While HTML is used in FIG. 1 and throughout the specification, the systems and methods of the embodiments of the present invention are not limited to HTML only and may also be applicable to the code of other markup languages such as XHTML, XML, JSON, LATEX, or other nested languages.

FIG. 1 illustrates how in an embodiment, the HTML code of a URL is captured from a website, passed through a computational engine to parse the HTML into an image.

Network 100 contains a machine or device 103 (e.g., computer, phone, tablet, or other network devices) that has connections to and is in communication with (e.g., wireless communication) a markup language database 104 and to the internet 101. A predefined URL list 102 is input into the device 103 and send to the markup language database 104. Data from the markup language database 104 is sent to a distributed processing engine 105. The distributed processing engine 105 contains a markup language module 106 that includes a parsing module 107 and an image generation module 108. The markup language module 106 contains the curation operation(s) which convert the markup language data into compressed images. These curation operations may include the parsing and processing of the HTML code by the parsing module 107 and the mapping of the processed data into compressed images by image generation module 108.

After the HTML code of multiple websites are parsed and mapped into compressed images, a collection of the corresponding compressed images is sent to an unsupervised machine learning model, a generative adversarial convolutional autoencoder, within training module 109. The training module 109 (e.g., machine learning training module) generates a model over the set of compressed HTML images from popular websites. In an embodiment, the generative adversarial convolutional autoencoders is a machine learning device that employs a method that makes use of two independent networks in a competitive fashion against one another. The competition strengthens the performance of each of the two networks. One of the networks is a generative adversarial neural network that attempts to learn the underlying data model in order to be able to generate realistic looking generated data. The other neural network is a discriminative neural network. The discriminative neural network learns to discern between the real data samples and the fake ones generated by the generative neural network. The generative network uses feedback from the discriminative network to improve the data model while the discriminative network learns how to better gage real data versus fake data. In an embodiment of the invention, a generative adversarial network is trained over the HTML images, and the generator learns the true distribution of the data and the discriminator learns to discern the true images. At the end of training process, the discriminator is able to label the markup language (e.g. HTML) of a website as being "fake", suspicious, malicious, or anomalous relative to the common markup language (e.g., HTML) that the system was trained on.

As noted above, in an embodiment, an autoencoder (e.g., convolutional autoencoder) may be used to model and classify image data in an unsupervised fashion. In an embodiment, the training module 109 may utilize machine learning in order to generate a model which represents the underlying image structure. The model from the training module 109 and the images from the image generation module 108 are then passed into the model prediction module 110 to detect URL's which are anomalous with respect to the model. This process has the advantage of allowing unsupervised detection (i.e., detection without requirement of any labeled data specifying the subject matter of an image) of potentially malicious websites. These non-malicious websites are then stored in a database 111 for further inspection.

Figure 2:
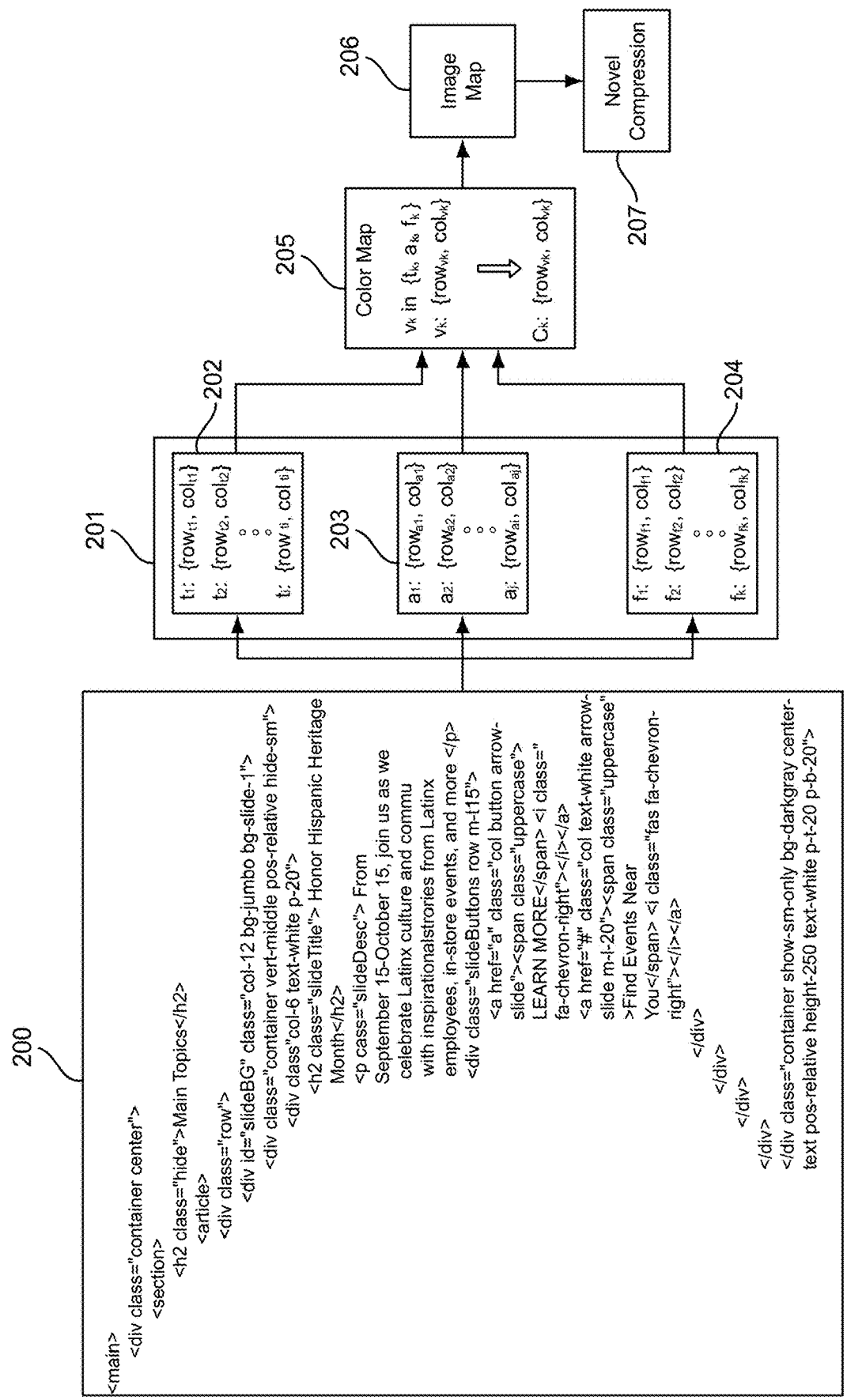
FIG. 2 is a block diagram illustrating a method of transforming raw HTML data into a compressed image format, according to an embodiment of the present invention.

FIG. 2 illustrates the method of transforming the markup language, or other nested language code that creates a website, into a compressed image format according to an embodiment of the present invention. The transformation takes place within the distributed processing engine 105. In an embodiment, a website is created using a series of strings of HTML code 200 as illustrated. The HTML code 200 of the website can be decomposed or broken down into element characteristics or individual nested element characteristics 201. In an embodiment, the nested element characteristics 201 include tags (t) 202, attributes (a) 203 and content features (f) 204. In an embodiment, the tags 202 are the rows and nesting depth locations of the HTML code such as (e.g., head, frame, audio, style, etc.) 202; the attributes 203 provide additional information to the tags; and features 204 are the values of attributes (e.g., names, types, etc.). In an embodiment, the features are specific content type of attributes, and the attributes are specific types of the tag. In an embodiment, the features are nested under the attributes and the attributes are nested under the tags in a 2D illustration of the HTML code 200.

Once the nested element characteristics 201 are extracted, the values of the entire nested structure are then mapped into a color map 205 (e.g., RGB color cube pixels). The color map 205 is created as a function of the value of the tags, attributes and features. A method of color mapping according to an embodiment herein is described in further detail below. Then, an image map 206 is generated using the pixel colors that are assigned into the specific location of the tags, attributes, and features. In an embodiment, the location of the elements within the markup language represent their pixel location within the image and the color represents the pixel color. The generated image 206 is finally compressed through a compression module 207 to obtain a compressed image.

Figure 3:
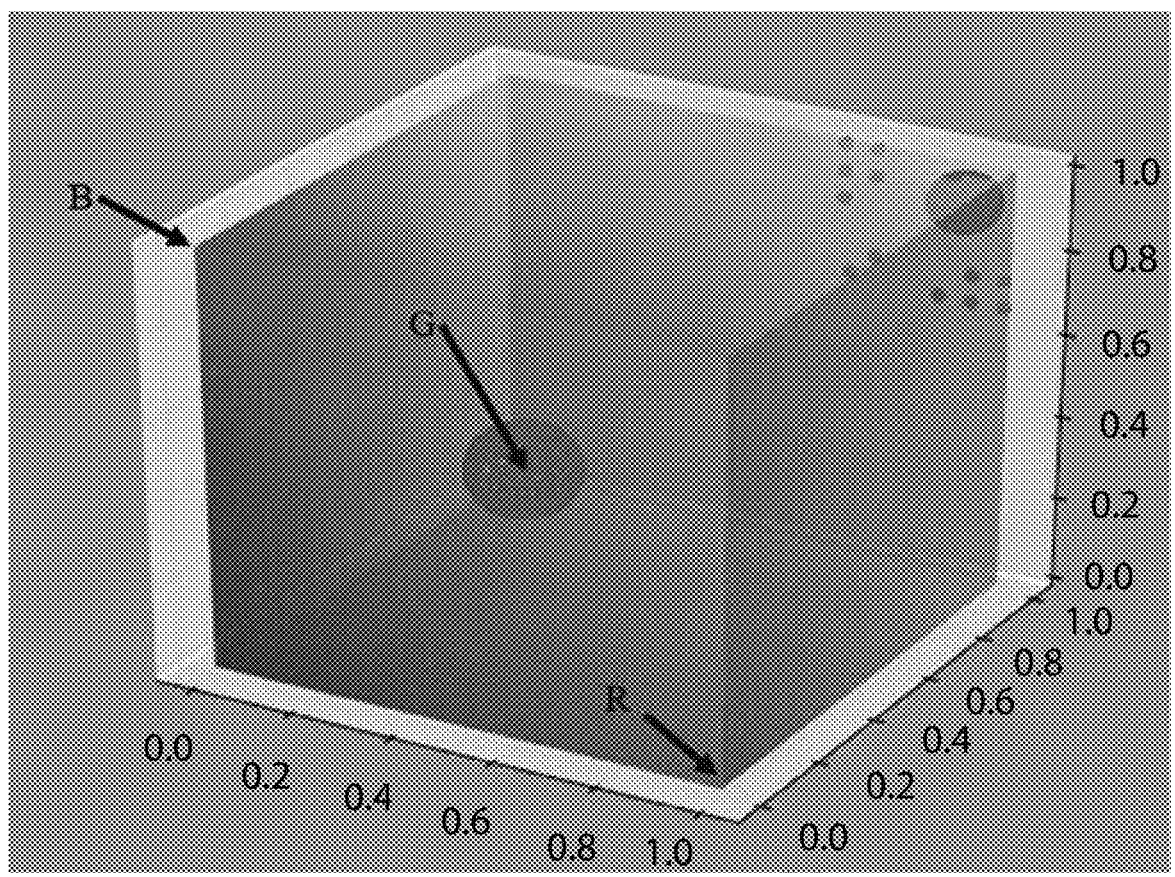
FIG. 3 illustrates an embodiment of a mapping of various HTML features into separate spheres or spherical components within an RGB color cube.

FIG. 3 illustrates an embodiment of a color map 205 into spheres within an RGB cube. In an embodiment, the method maps different categories of elements into different vertices of the RGB cube in order to assure that they are significantly far away from one another. The color boundaries are specified by these vertices and the edges between them. This allows the tags and different elements to be maximally spaced apart and differentiable by an image processing algorithm that is used to create the image map or generated image 206. A sphere surrounding a particular vertex may be used to represent the boundaries for which the features (e.g., tags/attributes/content types) of a certain type must fit into. Other shapes may also be utilized. In an embodiment, the values of are selected to be spread out so that they cannot be confused with one another within a noisy environment.

Figure 4A:
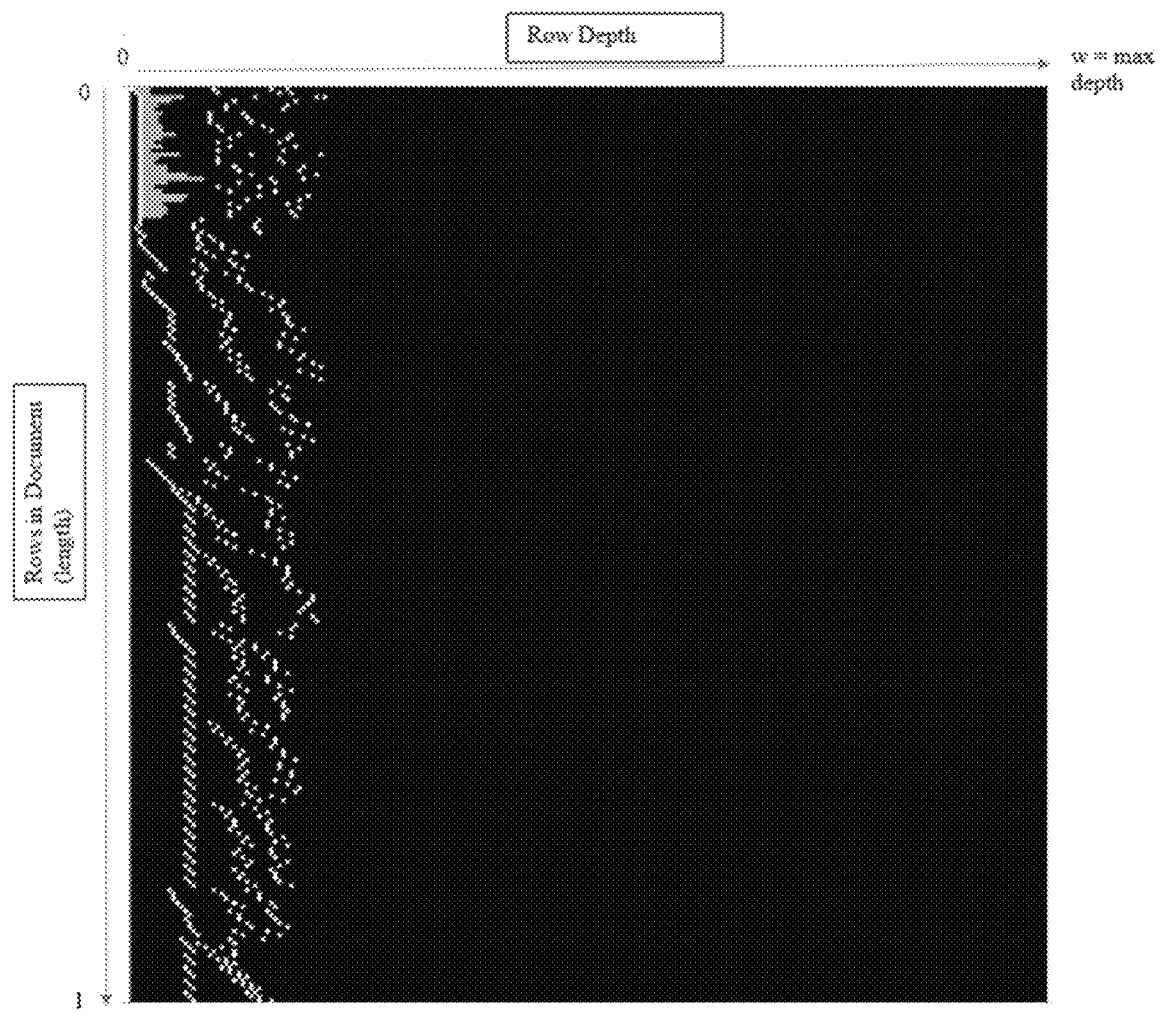
FIG. 4A illustrates the transformation of raw HTML data into an image according to embodiments of the present invention.
Figure 4B:
FIG. 4B illustrates the transformation of the image of FIG. 4A into a compressed image according to embodiments of the present invention.

FIG. 4A conveys an example HTML file that has been converted into the image map 206 of FIG. 2. FIG. 4B shows the compressed image output of the compression module 207. FIG. 4A has been zoomed out with respect to FIG. 4B so that the entire row length is visible. Because of the length (i.e., lots of coded rows) and also width (i.e., deep nested structure) of the HTML files, image compression is needed in order to reduce the dimensions for processing. This is achieved by taking advantage of the structure of the nested language. In an embodiment, the method keeps track of the maximum nesting of each row.

In an embodiment, the image is generated using the following steps. First an empty two-dimensional (2D) image is generated with rows=length of markup language document and columns=maximum chosen depth. For all non-empty rows and columns (i,j) in the markup language document: 1) extract the element v in (i,j); 2) map v to a feature value f; 3) map feature value f to a color c; and 4) add a pixel of color c to location (i,j) in image grid.

In an embodiment, the image compression occurs using the following steps. First, an image size is chosen to be x by y, where y is smaller or equal to the maximum nesting depth chosen. Then, the current image length 1 is truncated to be equivalent to x, to remove the 1-x bottom half of the image. In an embodiment, steps for adding truncated rows include: a) setting the row_index=0 (the first row); and then b) for each of the removed 1-x rows: i) locating the first row index, j where j>row_index, which contains enough depth left to fill the entire rows depth. (Enough depth meaning the amount of space left between the last pixel with respect to nesting depth/column number in the image). If none exists, ii) then attach this row to a list S. Then c) update row_index=j. Finally, for any rows in list S, go to step a) until list S cannot be fit into any of the remaining width.

Figure 5:
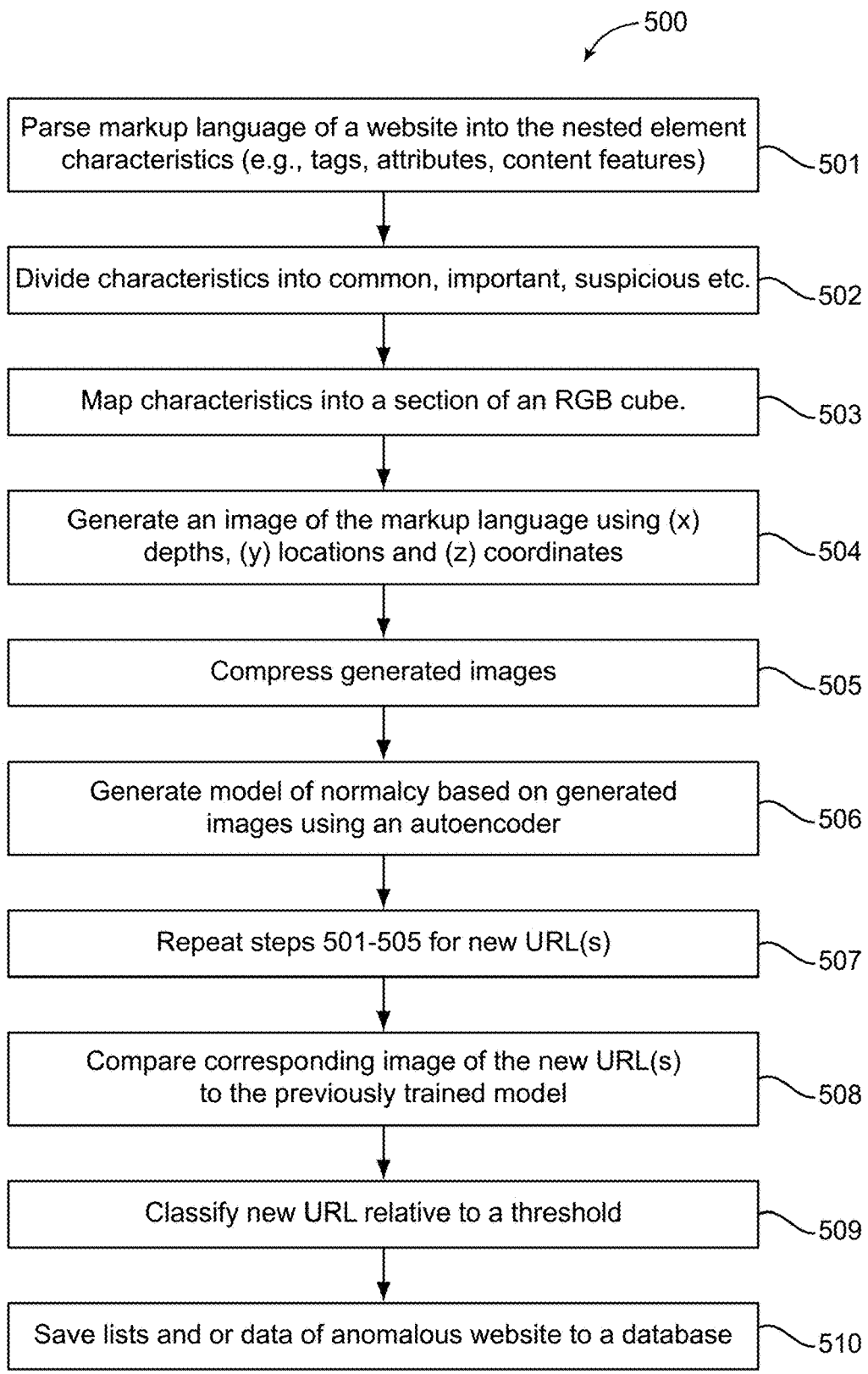
FIG. 5 is a flow chart of a method of suspicious website detection according to embodiments of the present invention.

FIG. 5 is an embodiment of a method 500 of detecting malicious, anomalous, and/or suspicious websites. In step 501, the markup language of a website is first parsed into nested element characteristics (e.g., tags, attributes, content features and values and their corresponding depths and locations). In step 502, these element characteristics are divided into categories including common, important, suspicious or other classifications. In step 503, the element characteristics are mapped into a particular section of an RGB cube. In step 504, the depths and locations and generated colors are used to generate an image of the markup language file/data. In step 505, the generated images are compression using an algorithm to convert the image into a desired image size. The image size may be selected based on the available processing capacity (e.g., computer memory and hardware resources). The compression algorithm utilized has the advantage of providing lossless compression for the majority of markup language data files, such as HTML, data, and there is only negligible data loss for unusually large files. In an embodiment, a large quantity of URLs may be collected and then compressed into the images simultaneously in step 505. In step 506, the compressed images are used in an adversarial autoencoder in order to generate a model of normalcy. In step 507, the new URLs are taken, and their corresponding HTML data is extracted and processed/parsed into images. In step 508, the images are compressed and processed through the previously trained model. In step 509, the trained model is analyzed to determine whether it fits a likelihood score of the image. The likelihood score, relative to a normalcy threshold, indicates whether the HTML file should be classified as normal or anomalous. In step 510, a list of malicious websites that meet or exceed the threshold, and other data relating to the website is saved to a database.

It will be appreciated that some exemplary embodiments of the systems and methods described herein may include a variety of components such as one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for detecting anomalous websites, the method comprising the steps of:
 parsing code of website into a plurality of data elements, each data element having a plurality of characteristics;
 mapping, for the website, each of the plurality of data elements to a color corresponding to a location in a 3D color cube, wherein the location is based on that data element's characteristics, and assigning the mapped color to the data element;
 generating an image corresponding to the website by generating an image comprised of pixels, wherein each data element of the website is represented by a pixel at an x-y coordinate of the image representing a location of that data element within the code of the website, wherein the pixel has the color previously assigned to that data element;
 compressing the image into a compressed image;
 comparing the compressed website to a normalcy model; and
 based on the comparison, determining whether the website is anomalous relative to a threshold of normalcy.

2. The method of claim 1, wherein the plurality of characteristics includes at least one of tags, attributes, and content features.

3. The method of claim 1, wherein the step of mapping comprises, for the 3D color cube, assigning colors within the 3D color cube as a function of a type of the plurality of characteristics.

4. The method of claim 1, wherein the 3D color cube is a RGB color cube.

5. The method of claim 1, wherein the image has a number of rows of pixels based on the number of rows of code of the website.

6. The method of claim 1, wherein the code is a nested markup language.

7. A system for detecting anomalous websites, the system comprising:
- a first database comprising memory for storing and receiving data representing a website obtained from a device connected to the internet; and
- a distributed processing engine configured to perform the steps of:
    - parsing the code of the website into a plurality of data elements, each data element having a plurality of characteristics;
    - mapping, for the website, each of the plurality of data elements to a color corresponding to a location in a 3D color cube, wherein the location is based on that data element's characteristics, and assigning the mapped color to the data element;
    - generating an image corresponding to the website by generating an image comprised of pixels, wherein each data element of the website is represented by a pixel at an x-y coordinate of the image representing a location of that data element within the code of the website, wherein the pixel has the color previously assigned to that data element;
    - compressing the image into a compressed image;
    - comparing the compressed website to a normalcy model; and
    - based on the comparison, determining whether the website is anomalous relative to a threshold of normalcy.

8. The system of claim 7, further comprising a second database comprising memory for storing a list of anomalous websites.

9. The system of claim 7, wherein each of the plurality of images has a number of rows of pixels based on the number of rows of code of the website.

10. The system of claim 7, wherein the data comprises nested language data of the website.

11. The system of claim 7, wherein the 3D color cube is an RGB cube.

12. The system of claim 7, wherein the plurality of characteristics includes at least one of tags, attributes, and content features.

13. The system of claim 7, wherein the step of mapping comprises, for the 3D color cube, assigning colors within the 3D color cube as a function of a type of the plurality of characteristics.

14. A non-transitory computer readable medium storing computer program instructions that, when executed by a processor, cause the processor to perform a method comprising the steps of:
- parsing code of website into a plurality of data elements, each data element having a plurality of characteristics;
- mapping, for the website, each of the plurality of data elements to a color corresponding to a location in a 3D color cube, wherein the location is based on that data element's characteristics, and assigning the mapped color to the data element;
- generating an image corresponding to the website by generating an image comprised of pixels, wherein each data element of the website is represented by a pixel at an x-y coordinate of the image representing a location of that data element within the code of the website, wherein the pixel has the color previously assigned to that data element;
- compressing the image into a compressed image;
- comparing the compressed website to a normalcy model; and
- based on the comparison, determining whether the website is anomalous relative to a threshold of normalcy.

15. The non-transitory computer readable medium of claim 14, wherein the plurality of characteristics includes at least one of tags, attributes, and content features.

16. The non-transitory computer readable medium of claim 14, wherein the step of mapping comprises, for the 3D color cube, assigning colors within the 3D color cube as a function of a type of the plurality of characteristics.

17. The non-transitory computer readable medium of claim 14, wherein the 3D color cube is a RGB color cube.

18. The non-transitory computer readable medium of claim 14, wherein the image has a number of rows of pixels based on the number of rows of code of the website.

19. The non-transitory computer readable medium of claim 14, wherein the code is a nested markup language.

* * * * *